(No Model.) 2 Sheets—Sheet 1.
J. F. BUTZ.
FREIGHT AND GRAIN CAR.
No. 481,928. Patented Sept. 6, 1892.
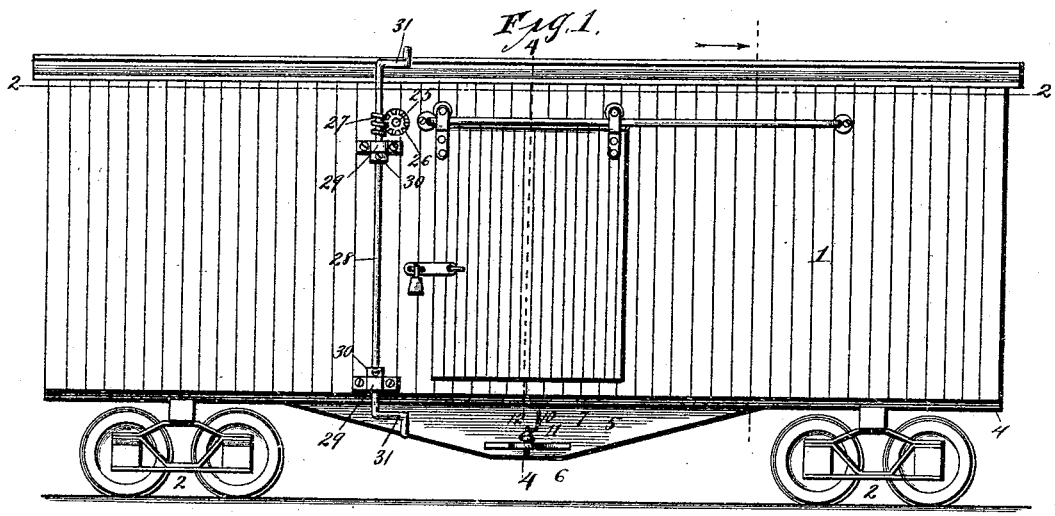
Fig. 1.
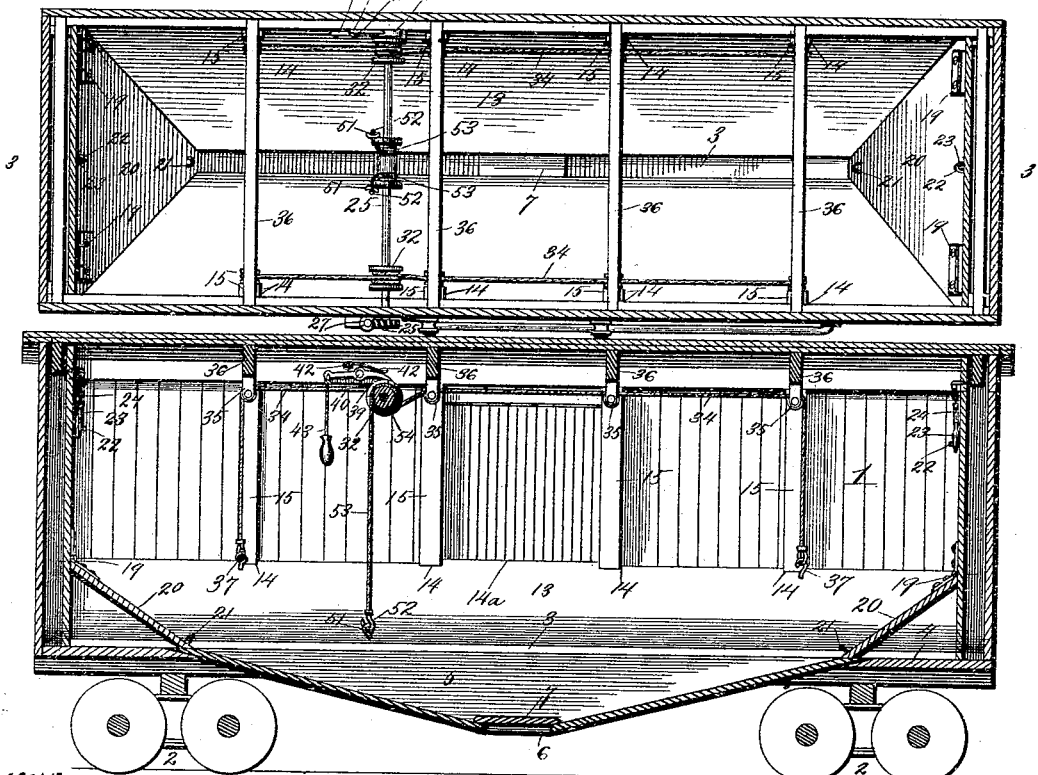
Fig. 2.
Fig. 3.
Witnesses:
Inventor:
John F. Butz,
By Higdon & Higdon
Attys.

(No Model.) 2 Sheets—Sheet 2.
J. F. BUTZ.
FREIGHT AND GRAIN CAR.
No. 481,928. Patented Sept. 6, 1892.
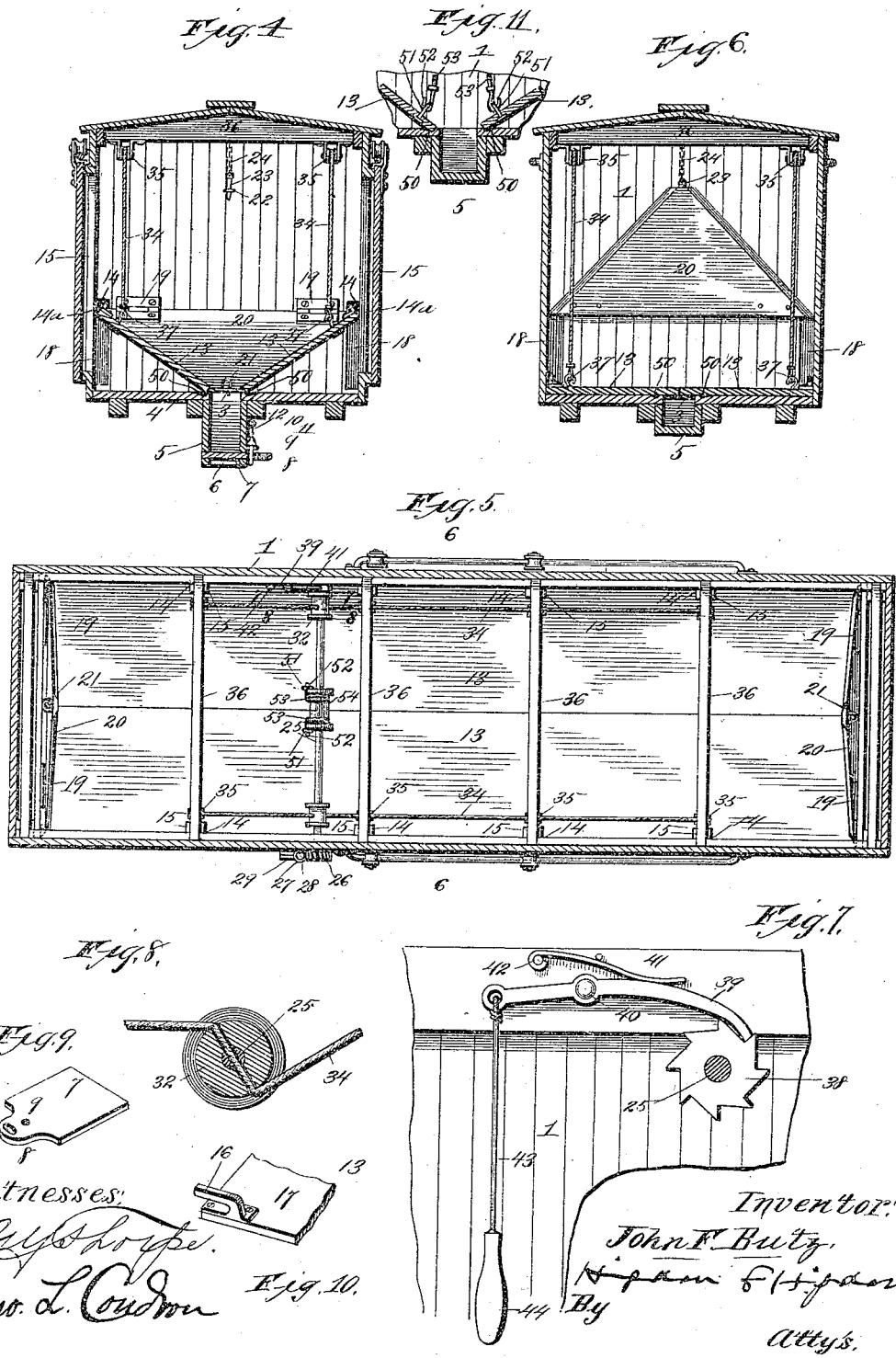

UNITED STATES PATENT OFFICE.

JOHN F. BUTZ, OF FORT WORTH, TEXAS.

FREIGHT AND GRAIN CAR.

SPECIFICATION forming part of Letters Patent No. 481,928, dated September 6, 1892.

Application filed April 21, 1892. Serial No. 429,988. (No model.)

*To all whom it may concern:*

Be it known that I, JOHN F. BUTZ, of Fort Worth, Tarrant county, and State of Texas, have invented certain new and useful Improvements in a Combined Dead-Freight and Grain Car, of which the following is a full, clear, and exact description, reference being had to the accompanying drawings, forming a part hereof.

My invention relates to that class of railway-cars which are employed in the transportation of what is known as "dead" freight, in contradistinction to "live" freight, such as living animals, &c., and also for transporting grain or cereals or like loose granular substances in bulk; and the objects of my invention are to produce a freight-car which shall be simple, strong, durable, and comparatively inexpensive in construction, and which shall, by virtue of its attachments, be capable of instant transformation from a car for transporting grain, cereals, and similar loose substances in bulk to a car for transporting miscellaneous dead freight.

A still further object of my invention is to produce attachments which may be readily applied to dead-freight cars as at present constructed without necessitating total alteration of the construction of such cars, and which shall adapt said cars for the transportation of both miscellaneous dead freight and grain, cereals, and like loose substances in bulk.

A still further object of my invention is to produce attachments which shall not only be quickly adjustable so as to transform the carrying character of the car, as above stated, but which when used for transporting grain and the like loose substances in bulk shall permit of the ready dumping or unloading of the grain and also avoid the necessity of using special grain-doors for the cars.

To the above purposes my invention consists in certain peculiar and novel features of construction and arrangement, as hereinafter described and claimed.

In order that my invention may be fully understood, I will proceed to describe it with reference to the accompanying drawings, in which—

Figure 1 is a side elevation of a combined dead-freight and grain car embodying my invention. Fig. 2 is a horizontal longitudinal section of the same on the line 2 2 of Fig. 1, the attachments being adjusted for the transportation of grain and the like in bulk. Fig. 3 is a longitudinal horizontal section of the same on the line 3 3 of Fig. 2. Fig. 4 is a transverse vertical section of the same on the line 4 4 of Fig. 3. Fig. 5 is a horizontal longitudinal section of the car, similar to the sectional view in Fig. 2, but showing the attachments adjusted for the transportation of miscellaneous dead freight. Fig. 6 is a transverse vertical section of the same on the line 6 6 of Fig. 5. Fig. 7 is a detached sectional view of certain of the operative connections of the attachments on the line 7 7 of Fig. 5, the said connections being shown on an enlarged scale. Fig. 8 is a detached sectional view of certain of the operative connections, also on an enlarged scale and on the line 8 8 of Fig. 5. Fig. 9 is a detached perspective view of the discharging-slide. Fig. 10 is a similar view of a portion of one of the lateral bottom sections, showing one of its guiding-studs. Fig. 11 is a detached transverse vertical sectional view of the lower part of the car, showing portions of the attachments for raising the inner parts of the removable lateral bottom sections out of their grooves.

In the said drawings 1 designates the body portion of what is known as a "box-car," the said body portion being either of the usual or any preferred type suitable for the transportation of miscellaneous dead freight and also grain or other similar loose substances in bulk. 2 designates the trucks and wheels of the same, these parts being, also, of the usual or any preferred type of construction.

3 designates a narrow slot, which is formed in the bottom 4 of a car and which extends longitudinally therefrom near one end of the same to near the opposite end thereof, as shown.

Beneath the bottom 4 of the car is bolted, framed, or otherwise suitably and strongly secured a chute or trough 5, the upper part of said chute or trough conforming in size and dimensions with the slot 3. The bottom of this chute or trough is inclined oppositely downward to its middle, at which point said bottom is provided with a discharge-opening 6. Immediately above this discharge-opening 6 is mounted a horizontal slide 7, which extends transversely of the chute or spout and which works through suitable slots or openings in the sides of the said chute, as shown. One end of this slide 7 is formed with an extension 8, which when the slide is in closed position projects outwardly from the corresponding side of the chute. The slide 7 is normally retained in this closed position by a suitable pin 10, which is passed downward through an eye or staple 11 on the corresponding side of the chute and the lower end of which pin enters an opening 9 in the extension 8 of the slide, the head of the pin being preferably connected to the chute by a chain 12 or other suitable flexible connection, so as to avoid loss of the pin.

It is to be understood that any other suitable or preferred means may be employed for retaining the slide in its normal closed position, and it is to be further understood that, if desired, the slide 7 may extend entirely through the chute and be provided with the described retaining parts and attachments at both ends, so as to be operated from either side of the car-body.

Upon the bottom of the car-body 1 are supported two vertically and laterally movable lateral bottom sections 13, each of which is of such length from one end of the car-body to the opposite end of the same, and each of which is of a width corresponding to one-half of the interior width of the car-bottom. At its outer longitudinal edge or margin each of these movable lateral bottom sections 13 is formed with a number of recesses or notches 14 to receive the vertical side standards 15 of the car-body, the said standards thus operating as guides to assist in insuring the proper movements of the said bottom sections. Midway of its length the outer edge or margin of each bottom section 13 is also formed with an extension 14ª, which enters the side-door openings, as shown, and thus further assist in directing the movements of the bottom sections. The proper operative movements of these bottom pieces 13 are further insured by means of horizontal arms 16, which are formed upon plates 17, the latter being bolted or otherwise suitably secured to the ends of the bottom pieces 13 near the outer edges, the outer ends of said arms entering vertical grooves 18, which are formed in the ends of the car-body near the side margins of said ends.

To the inner surfaces of the ends of the car-body 1 are secured, by any suitable number of hinges 19 of the usual or any preferred type, two inverted triangular bottom sections 20, the said hinges being secured to the upper or inverted base margins of the bottom sections, and there being one of said end sections attached to each end of the car-body, as shown.

When the car is being used to transport loose grain or similar material in bulk, the lateral bottom sections 13 are raised, as hereinafter described, so as to extend obliquely downward and inward, and the end bottom sections are lowered so as to also extend downward and inward upon the lateral bottom sections 13. When, however, the car is to be used for the transportation of miscellaneous dead freight, the lateral bottom sections 13 are lowered into horizontal position, as hereinafter explained, and the end bottom sections 20 are raised so as to stand vertically against the ends of the car. In order to retain the end bottom sections in such elevated position, an eye or staple 21 or an equivalent attachment is secured to the upper side of each end bottom section near the free end or apex thereof, and a suitable eye or staple 22 or an equivalent attachment is secured to the inner surface of each end of the car-body. When the end bottom sections 20 are raised, the staples register with each other, and a suitable pin 23 is now inserted downwardly through each registering pair of eyes or staples and serves to retain the corresponding end bottom section in elevated position, there being thus one of the pins at each end of the car-body, and a suitable chain 24 or similar flexible connection being attached to the head of the pin and to the end of the car-body so as to keep the pins from being lost.

In the upper part of the car-body 1, just beneath the roof of the same, is placed a horizontal shaft 25, which extends transversely of the car-body and the ends of which project through the sides of the car-body. Upon one end of the shaft 25 is secured a worm-wheel 26, the teeth of which are engaged by a worm-thread 27, which is carried by the upper part of a vertical worm-shaft 28. This shaft 28 is mounted outside of the car-body 1 and turns in bearing-brackets 29, which are bolted or otherwise strongly secured to the side of the car, as shown, the shaft 28 carrying, also, retaining-collars 30 for preventing dislocation of the shaft. At its upper and lower ends the shaft 28 carries crank-handles 31 or equivalent attachments, by means of which the worm-shaft can be rotated from the roof of the car or from the ground, as desired, and it is to be understood that, if so preferred, there may be a second vertical shaft 28 mounted at the opposite side of the car and carrying the handles 31 and worm 27, while the shaft 25 carries, also, a second worm-wheel 26. The shaft 25 also carries, at points near its ends and within the car, a pair of oppositely-disposed winding-drums 32, each of which is keyed or otherwise secured to the shafts, so as to turn therewith. Through each of these two drums extends a rope 34 or similar flexible connection, which extends thence oppositely longitudinally of the car and over suitable guide-sheaves 35, which are secured to the ends of the cross-beams 36, there being thus two of the said flexible connections 34 and each of said connections extending continuously from its drum toward the opposite ends of the car. The end portions of the flexible connections 34 extend downwardly and are secured at their lower ends to eyebolts 37 or equivalent devices, which are secured to the upper surfaces of the lateral bottom sections 13 near their outer margins.

Upon one of the end portions of the shaft 25, at a point within the car-body and adjacent to the inner surface of one side of the same, is mounted a ratchet-wheel 38, the teeth of which are engaged by the tip of a pawl which is pivoted, as at 40, upon the inner surface of the upper part of the corresponding side of the car-body. The tip of the pawl 39 is retained in engagement with the teeth of the ratchet-wheel 38 by a spring 41, which is secured, as at 42, to the said portion of the car-body. To the opposite or free end of this pawl is connected to upper end of a pendent rod 43 a cord or other similar connection, to the lower end of which is secured a handle 44.

Now the operation of the above-described attachments is as follows: When the car is used for the transportation of miscellaneous dead freight, the movable lateral bottom sections 13 are lowered into horizontal position, as shown in Figs. 5 and 6, the inner margins of the said lateral bottom sections abutting closely against each other, and the end bottom sections 20 being raised and retained in such raised position by the pins 23 and registering staples or eyes 21 and 22. The bottom 4 of the car and the slot 3 of the same are thus completely covered by the lateral bottom sections, so that nothing can drop into the chute 5. When grain or other loose material in bulk is to be loaded into the car, the crank-handles 31 (or either of them) are turned so as to rotate the vertical shaft 28 in the proper direction, the rotary movement of said shaft being transmitted through the worm 27 and the worm-wheel 26 to the shaft 25, so as to cause said shaft to revolve in the proper direction. This revolution of the shaft 25 winds the flexible connections 34 upon the drums 32, causing the outer margins of the lateral bottom sections 13 to move upward and the inner margins of said sections to move outward laterally, opening the slot 3 and causing the middle parts of lateral bottom sections to rise against the openings of the side doors of the cars, and thus serve as grain-doors therefor. Pawl 39 retains the shaft 25 against reversed rotation, and thus also retains the lateral bottom sections 13 in their elevated position, and after such lateral bottom sections have been so elevated the end bottom sections 20 are lowered so as to extend obliquely inward and downward and to rest upon the end portions of the lateral bottom sections. Grain or other loose material in bulk being now loaded into the car will fall into the chute 5 and then fill the car up to or nearly to the level of the upper or outer margins of the lateral bottom sections 13 and end sections 20. When it is desired to unload the grain either wholly or in any desired quantity, the slide 9 is drawn outward and the grain flows readily out of the chute 5. If, after the car has discharged its load or grain, it is desired to load it again with miscellaneous dead freight, the operator pulls down upon the handle 44, disengaging the pawl 39 from the ratchet-wheel 38, and thus permitting the shaft 25 to rotate in the reversed direction, so as to unwind the flexible connections 34 and permit the lateral bottom sections 13 to drop into horizontal position. The end bottom sections 20 are now raised, as before, and the car is ready to receive its load of miscellaneous dead freight.

From the above description it will be seen that I have produced a freight-car which is not materially altered in its general construction from the usual types and the attachments to which are simple, strong, durable, and comparatively inexpensive in construction, and also easily and quickly operated, so as to readily transform the car into a carrier for miscellaneous dead freight or grain in bulk, and vice versa. It is to be understood that when the attachments are adjusted for transporting miscellaneous dead freight the car is equally adapted for the transportation of live stock; but the principal intention is in such adjustment as to transport dead freight.

In order to retain the bottom sections 13 in properly raised position, two longitudinal grooves 50 are formed in the upper side of the car-bottom parallel with each other and at opposite sides of the slot 3. Into these grooves fit the inner margins of the lateral bottom sections 13 when said sections are in raised position. To these lateral bottom sections, near their inner margins, are secured two eyebolts 51, which are engaged by hooks 52, which are secured to the lower ends of ropes 53 or other suitable flexible connections. The upper parts of these flexible connections are secured to a drum 54, which is mounted upon the shaft 32, so as to turn therewith. As the shaft is revolved in one direction the inner margins of the lateral bottom sections 13 are lifted sufficiently to clear the grooves 50, and said bottom sections may then be readily lowered into horizontal position, as above described.

Having thus described my invention, what I claim as new therein, and desire to secure by Letters Patent, is—

1. A combined dead-freight and grain car comprising a car-body provided with a longitudinally-slotted bottom, vertically and outwardly movable lateral bottom sections, and vertically-movable end bottom sections hinged to the ends of the car-body, substantially as set forth.

2. A combined dead-freight and grain car comprising a longitudinally-slotted bottom, a chute or trough located beneath the bottom and communicating with the slot and also provided with a suitable discharge-slide, and vertically and outwardly-movable lateral bottom sections, and vertically-movable end sections located within the car-body above its bottom, substantially as set forth.

3. A combined dead-freight and grain car having a longitudinally-slotted bottom and provided, also, with a chute or trough extending externally of and longitudinally beneath said bottom and communicating with the slot and having a downwardly-converging bottom, and a discharge-slide mounted in the middle of said chute, the chute being wholly external from the car-bottom, substantially as set forth.

4. A combined dead-freight and grain car provided with outwardly and vertically movable lateral bottom sections, said sections being recessed and extended at their outer margins to receive the side standards of the car-body and also to enter the side door-openings, substantially as set forth.

5. A combined dead-freight and grain car provided with a pair of vertically and outwardly movable lateral bottom sections, a revoluble winding-shaft journaled in the upper part of the car-body and carrying oppositely-disposed winding-drums, and flexible connections leading from said drums and connected to the outer portions of the lateral bottom sections, substantially as set forth.

6. A combined dead-freight and grain car comprising outwardly and vertically movable lateral bottom sections, guiding-studs mounted at the ends of said sections, and guide-grooves at the ends of the car-body and serving to receive the said studs, substantially as set forth.

7. A combined dead-freight and grain car comprising end bottom sections hinged to the ends of the car-body, staples also secured to ends of the car-body, staples secured to the free ends of the end sections, and pins engaging said staples when the sections are raised, substantially as set forth.

8. A combined dead-freight and grain car comprising outwardly and vertically movable lateral bottom sections, a revoluble winding-shaft, flexible connections between said shaft and the bottom sections, and a pawl-and-ratchet opening to retain the shaft in its desired position and to release the same for reversed rotation, substantially as set forth.

9. A combined dead-freight and grain car comprising outwardly and vertically movable lateral bottom sections, a winding-shaft, flexible connections between the shaft and the bottom sections, a worm-wheel carried by said shaft and the bottom sections, a worm-wheel carried by said shaft, and a vertical operating-shaft having crank-handles at its upper and lower ends and also provided with a worm to engage the worm-wheel, substantially as set forth.

10. A combined dead-freight and grain car comprising a car-body having its bottom or floor longitudinally slotted and grooved, a pair of lateral bottom sections the inner margins of which are arranged to engage the grooves, a revoluble shaft mounted in the car-body, and flexible connections from said shaft to the bottom sections near their inner margins, substantially as set forth.

In testimony whereof I affix my signature in the presence of two witnesses.

JOHN F. BUTZ.

Witnesses:
A. AUGUST,
L. AUGUST.